(12) United States Patent
Barker et al.

(10) Patent No.: US 8,026,496 B2
(45) Date of Patent: Sep. 27, 2011

(54) ACOUSTIC CRYSTAL SONOLUMINESCENT CAVITATION DEVICES AND IR/THZ SOURCES

(75) Inventors: Delmar L. Barker, Tucson, AZ (US); William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 263 days.

(21) Appl. No.: 12/497,367

(22) Filed: Jul. 2, 2009

(65) Prior Publication Data

US 2011/0001063 A1    Jan. 6, 2011

(51) Int. Cl.
*B06B 3/04* (2006.01)
*B01F 11/00* (2006.01)
*G10K 11/02* (2006.01)

(52) U.S. Cl. .................. 250/493.1; 422/127; 366/108; 250/504 R (58) Field of Classification Search ............... 250/493.1
See application file for complete search history.

(56) References Cited

U.S. PATENT DOCUMENTS

| | | | |
|---|---|---|---|
| 4,333,796 A | 6/1982 | Flynn | |
| 5,658,534 A | 8/1997 | Desborough | |
| 5,659,173 A | 8/1997 | Putterman | |
| 5,858,104 A | 1/1999 | Clark | |
| 6,361,747 B1 | 3/2002 | Dion | |
| 7,078,697 B2 * | 7/2006 | Barker et al. | 250/343 |
| 7,257,333 B2 * | 8/2007 | Rosenwald et al. | 398/201 |
| 7,292,740 B1 | 11/2007 | Barker | |
| 7,510,322 B2 | 3/2009 | Satterwhite | |
| 7,677,790 B2 * | 3/2010 | Tessien | 366/108 |

FOREIGN PATENT DOCUMENTS

WO    WO/02/097823    12/2002

OTHER PUBLICATIONS

M. Iida "Enhanced generation of terahertz radiation using 3D photonic crystals with a planar defect" Proc. CLEO/QELS, Jun. 2002 (Baltimore) Section CM1.
K. Unterrainer et al "Cavity enhanced few cycle THz generation and coherent spectroscopy" Proc. CLEO/QELS Jun. 2002 (Baltimore), Section CM1.
H. Han et al "Terahertz pulse propagation in a plastic photonic crystal fiber" Applied Physics Letters, 80 #15, Apr. 15, 2002.
Johnathan C. Knight "Photonic crystal fibres" Nature, vol. 424 Aug. 14, 2000 pp. 847-851.

(Continued)

*Primary Examiner* — Jack Berman
*Assistant Examiner* — Eliza Osenbaugh-Stewart
(74) *Attorney, Agent, or Firm* — Eric A Gifford (57) ABSTRACT

An acoustic crystal structure includes defect cavities that concentrate the driving pressure from applied sound waves into the cavities to cavitate gas bubbles in a liquid to produce sonoluminescence. This device may be used to study sonoluminescence or cavitation or to perform sonochemistry, nuclear fusion etc. in the cavities. A waveguide may be operatively coupled to the acoustic crystal to extract, collect and route a band of electromagnetic (EM) radiation around a specified source wavelength to an output port for emission by an antenna to provide an EM source. The waveguide may, for example, be a photonic crystal defect waveguide, a photonic crystal optical fiber or Sommerfeld waveguide. The marriage of the sonoluminescence phenomena with an acoustic crystal and embedded waveguide provides for an efficient source of narrow or broad band IR or THz radiation.

21 Claims, 9 Drawing Sheets

OTHER PUBLICATIONS

M.J. King and J.C. Wiltse "Surface-wave propagation on coated or uncoated metal wires at millimeter wavelengths" IRE Transactions on Antennas and Propagation May 1962 pp. 246-254.

Giancarlo Righini "Terahertz flexible waveguides" Proceedings of SPIE, vol. 7366, Jun. 2009.

Michael Brenner "Single-bubble sonoluminescence" Reviews of Modern Physics vol. 74, May 13, 2002, pp. 425-484.

Hua Cao "Coupling of terahertz pulses into a single metal wire waveguide using milled grooves" Optics Express, vol. 13, No. 18 Sep. 5, 2005, pp. 7028-7034.

Seth J. Putterman "Sonoluminescence: Sound into Light" Scientific American Feb. 1995, pp. 32-37.

Shu Zhang "Focusing Ultrasound with an acoustic metamaterial network" Physical Review Letters 102, 194301 May 15, 2009.

C. Sehgai "Optical spectra of sonoluminescence from transient and stable cavitation in water saturated with various gases" The Journal of Physical Chemistry, vol. 84, No. 4, 1980, pp. 388-395.

M. Dan "Ambient pressure effect on single-bubble sonoluminescence" Physical Review Letters vol. 83, No. 9, Aug. 30, 1999.

* cited by examiner

ACOUSTIC CRYSTAL SONOLUMINESCENT CAVITATION DEVICES AND IR/THZ SOURCES

BACKGROUND OF THE INVENTION

1. Field of the Invention

This invention relates to sonoluminescent cavitation devices and to their use as sources of infrared (IR) or terahertz (THz) radiation.

2. Description of the Related Art

Sonoluminescence is a well-known phenomenon discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

Figure 1:
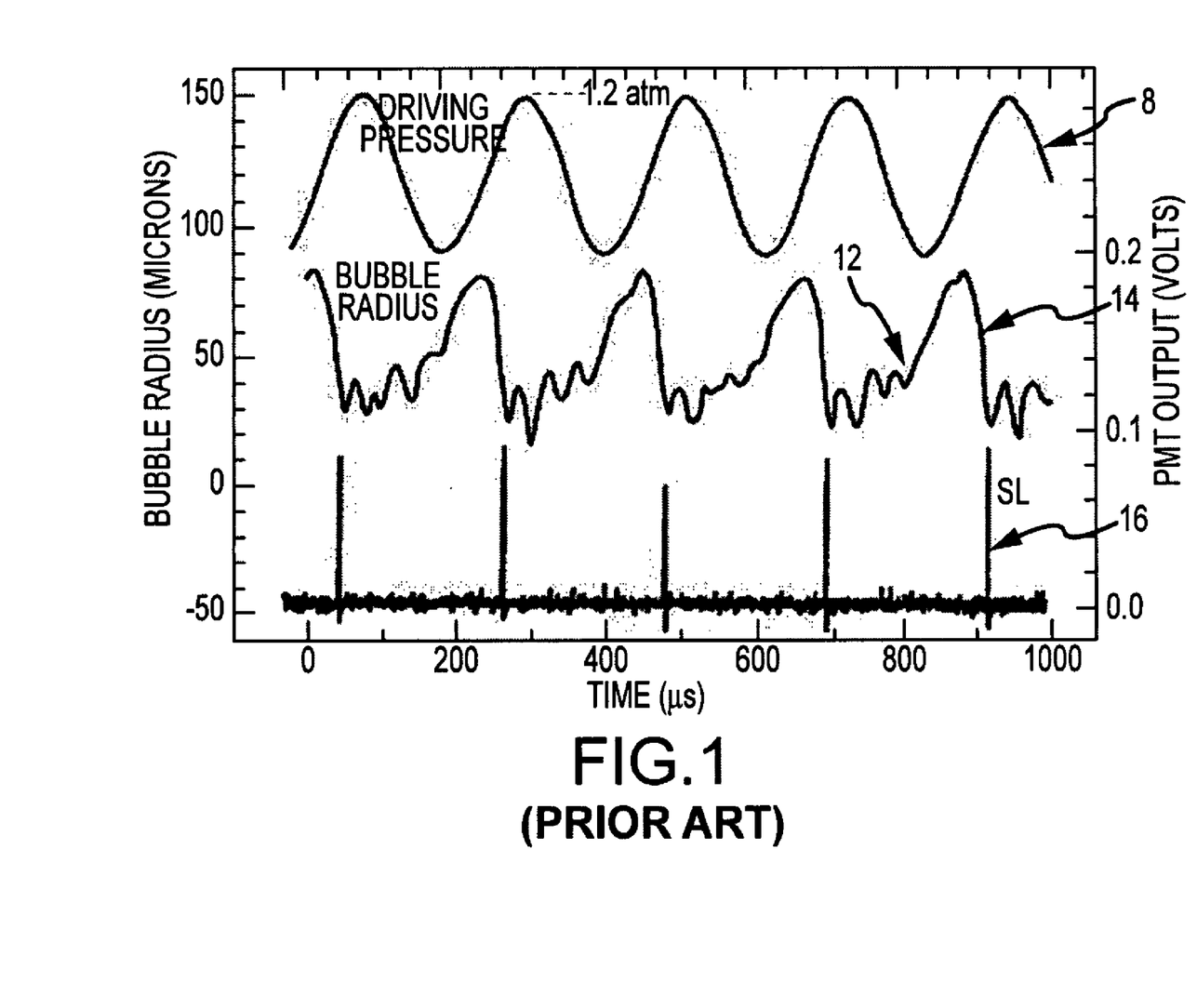
FIG. 1, as described above, is a plot of bubble radius versus time illustrating the expansion and collapse of gas bubbles under a driving pressure produced by sound waves to produce sonoluminescence.
Figure 2:
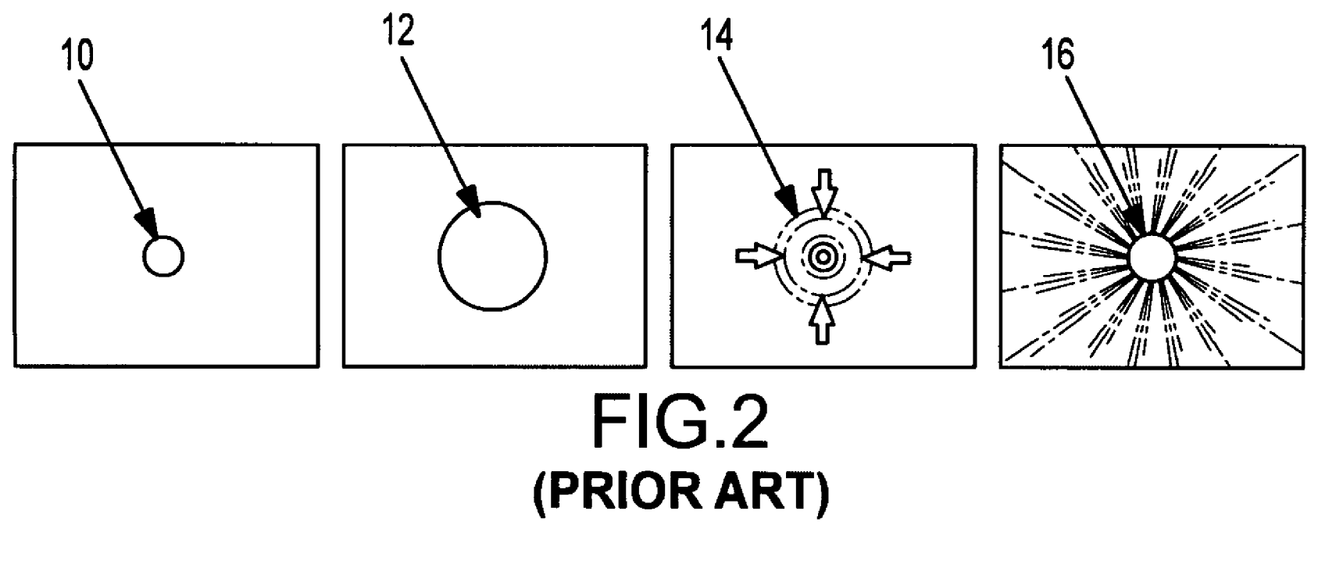
FIG. 2, as described above, is a diagram illustrating the formation, expansion and collapse of a gas bubble to emit light through sonoluminescence.

In essence, as shown in FIGS. 1 and 2 the cavitation process consists of three stages that are driven by the application of high intensity sound waves 8; bubble formation 10, growth 12 and subsequent collapse 14 that emits a flash or pulse of light 16. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.). In general, the negative driving pressure causes the bubble to expand; when the driving pressure changes sign, the bubble collapses, resulting in a short pulse of light. The bubbles may grow and collapse with each cycle of the sound wave as illustrated or may grow over multiple cycles before collapsing.

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, nuclear fusion, generation of nano-particles etc.).

In a typical cavitation system, for example as shown by Dan et al. in an article entitled Ambient Pressure Effect on Single-Bubble Sonoluminescence (vol. 83, no. 9 of Physical Review Letters), the cavitation chamber is a simple glass flask that is filled or semi-filled with cavitation liquid. A spherical flask is also disclosed in U.S. Pat. No. 5,659,173. The specification of this patent discloses using flasks of Pyrex®, Kontes®, and glass with sizes ranging from 10 milliliters to 5 liters. The drivers as well as a microphone piezoelectric were epoxied to the exterior surface of the chamber.

In some instances, more elaborate chambers are employed in the cavitation system. For example, U.S. Pat. No. 4,333,796 discloses a cavitation chamber designed for use with a liquid metal. As disclosed, the chamber is generally cylindrical and comprised of a refractory metal such as tungsten, titanium, molybdenum, rhenium or some alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn. The specification discloses that the horns, through the use of flanges, are secured to the chamber/housing walls in such a way as to provide a seal and that the transducers are mounted to the outer ends of the horns.

A tube-shaped cavitation system is disclosed in U.S. Pat. No. 5,658,534, the tube fabricated from stainless steel. Multiple ultrasonic transducers are attached to the cavitation tube, each transducer being fixed to a cylindrical half-wavelength coupler by a stud, the coupler being clamped within a stainless steel collar welded to the outside of the sonochemical tube. The collars allow circulation of oil through the collar and an external heat exchanger.

Another tube-shaped cavitation system is disclosed in U.S. Pat. No. 6,361,747. In this cavitation system the acoustic cavitation reactor is comprised of a flexible tube. The liquid to be treated circulates through the tube. Electroacoustic transducers are radially and uniformly distributed around the tube, each of the electroacoustic transducers having a prismatic bar shape. A film of lubricant is interposed between the transducer heads and the wall of the tube to help couple the acoustic energy into the tube.

U.S. Pat. No. 5,858,104 discloses a shock wave chamber partially filled with a liquid. The remaining portion of the chamber is filled with gas which can be pressurized by a connected pressure source. Acoustic transducers are used to position an object within the chamber while another transducer delivers a compressional acoustic shock wave into the liquid. A flexible membrane separating the liquid from the gas reflects the compressional shock wave as a dilation wave focused on the location of the object about which a bubble is formed.

PCT application Ser. No. US02/16761 (WO/2002/097823 published Dec. 5, 2002) discloses a nuclear fusion reactor in which at least a portion of the liquid within the reactor is placed into a state of tension, this state of tension being less than the cavitation threshold of the liquid. The liquid preferably includes enriched deuterium or tritium, the inventors citing deuterated acetone as an exemplary liquid. In at least one disclosed embodiment, acoustic waves are used to pre-tension the liquid. In order to minimize the effects of gas cushioning during bubble implosion, the liquid is degassed prior to tensioning. A resonant cavity is formed within the chamber using upper and lower pistons, the pistons preferably fabricated from glass. The upper and lower pistons are smaller than the inside diameter of the chamber, thus allowing cavitation liquid to pass by the pistons. In a preferred embodiment, the upper piston is flexibly anchored to the chamber using wire anchors while the lower piston is rigidly anchored to the chamber.

U.S. Pat. No. 7,510,322 discloses a cavitation chamber separated into three volumes by a pair of gas-tight and liquid-tight seals, each seal formed by the combination of a rigid acoustic reflector and a flexible member, is provided. During chamber operation, only one of the three volumes contains cavitation liquid, the other two chamber volumes remaining devoid of cavitation liquid. The cavitation system also includes a cavitation liquid reservoir coupled to the cavitation chamber by a conduit, a valve allowing the cavitation chamber to be isolated from the cavitation liquid reservoir. A second conduit couples the two unfilled chamber volumes to a region above the liquid free surface within the cavitation liquid reservoir. A second valve allows the two unfilled chamber volumes to either be coupled to the cavitation liquid reservoir by the second conduit, or be coupled to a third conduit, the third conduit leading either to the ambient atmosphere or to a high pressure gas source. The cavitation system also includes at least one acoustic driver.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention uses an acoustic crystal structure to enhance sonoluminescence. Defect cavities in the crystal structure concentrate the driving pressure from applied sound waves into the cavity to cavitate gas bubbles in a liquid to produce sonoluminescence. A waveguide may be coupled to the acoustic crystal to extract, collect and route a band of electromagnetic (EM) radiation around a specified source wavelength to an output port for emission by an antenna to provide an EM source. The marriage of the sonoluminescence phenomena with an acoustic crystal provides for an efficient source of narrow or broad band IR or THz radiation In an embodiment, a sonoluminescent cavitation device comprises an acoustic crystal including first and second materials having difference acoustic indices. The materials are arranged in a periodic array that provides local contrast modulation of the acoustic index in at least one dimension to define a band gap in the acoustic or ultrasonic transmission spectra. At least one defect cavity in the periodic array creates a resonance in the band gap. A gas is dissolved in a liquid in the at least one defect cavity. A source of sound waves is operatively coupled to the periodic array. The sound waves are concentrated in the at least one defect cavity to cause the bubble to expand and collapse (cavitate) producing a pulse of black-body radiation (e.g. sonoluminescence). This sonoluminescent device may be used to research the sonoluminescent phenomena or study cavitation or as a cavity to perform sonochemistry, nuclear fusion, create nano-particles, chemical detoxification, ultrasonic cleaning etc.

In an embodiment, a sonoluminescent EM source comprises a waveguide operatively coupled an acoustic crystal sonoluminescent cavitation device to extract, collect and route a band of electromagnetic (EM) radiation around a specified source wavelength to an output port for emission by an antenna to provide an EM source. Sonoluminescence in the defect cavity produces very high temperatures, hence elevated black-body radiation. At these high temperatures an inert gas is used to sustain sonoluminescence. The waveguide provides the means to extract a specified band of wavelengths, collect the radiation from the at least one defect cavity (typically multiple defect cavities) and efficiently route the collected radiation to an output for emission. The waveguide is on a much smaller scale than the acoustic crystal to avoid interfering with the coupling of the sound waves to the defect cavities. The waveguide may, for example, be a photonic crystal defect waveguide, a photonic crystal optical fiber or a Sommerfeld waveguide. Multiple waveguides tuned to different source wavelengths may be coupled to a single acoustic crystal sonoluminescent device. The marriage of the sonoluminescence phenomena with an acoustic crystal provides for an efficient source of narrow or broad band IR or THz radiation These and other features and advantages of the invention will be apparent to those skilled in the art from the following detailed description of preferred embodiments, taken together with the accompanying drawings, in which:

DETAILED DESCRIPTION OF THE INVENTION

The present invention describes an acoustic crystal structure for enhancing sonoluminescence. Defect cavities in the crystal structure concentrate the driving pressure from applied sound waves into the cavity to cavitate gas bubbles in a liquid in the defect cavity to produce sonoluminescence. A waveguide may be coupled to the acoustic crystal to extract, collect and route a band of electromagnetic (EM) radiation around a specified source wavelength to an output port for emission by an antenna to provide an EM source. The marriage of the sonoluminescence phenomenon with an acoustic crystal provides for an efficient source of narrow or broad band IR (approximately 1 micron to 30 micron) or THz (approximately 300 GHz to 4 THz) radiation. By convention IR sources are referred to in terms of wavelength while THz sources are referred to in terms of frequency.

As used herein a 'sound wave' refers to a pressure fluctuation that travels through a medium (solid, liquid or gas) at or near the speed of sound. A 'shock wave' is a sound wave that is traveling faster than the speed of sound in the medium. Shock waves are typically characterized by an abrupt, nearly discontinuous change in the characteristics of the medium.

Across a shock there is an extremely rapid rise in pressure, temperature and density of the flow.

Acoustic Crystal Sonoluminescent Cavitation Devices

Figure 3A:
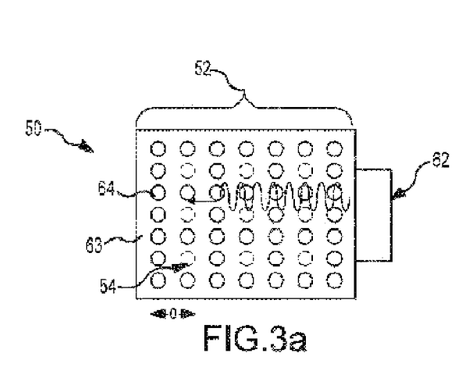
FIGS. 3a and 3b are respectively a diagram of an acoustic crystal sonoluminescent cavitation device and a defect cavity therein in accordance with the invention.
Figure 3B:
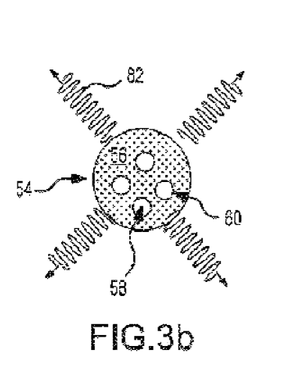

An acoustic crystal sonoluminescent cavitation device 50 includes an acoustic crystal 52 including at least one defect cavity 54 containing a liquid 56 having a gas 58 dissolved therein to form one or more bubbles 60 and a source 62 of sound waves such as a piezo electric transducer (PZT) that provide the driving pressure to cavitate the bubbles 60 to produce sonoluminescence.

Figure 4:
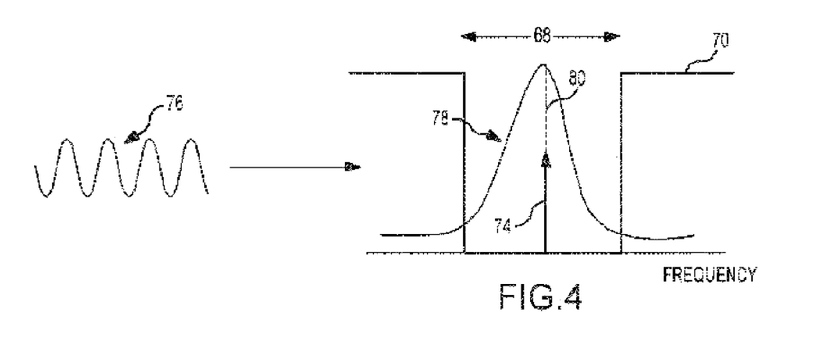
FIG. 4 is a diagram illustrating the overlap of the frequency spectra of the sound waves with the resonant frequency of the acoustic crystal's defect cavity to concentrate energy into the defect cavity to enhance sonoluminescence.

Acoustic crystal 52 includes a material 63 having a first acoustic index and a material 64 having a second acoustic index different than said first acoustic index. The materials may be a solid, liquid or gas. The materials are arranged in a periodic array that provides local contrast modulation of the acoustic index in at least one dimension. A 2-D array as shown provides modulation in 1-D. A 3-D array would provide modulation in 2-D. A local contrast modulation of at least 1.6 for a 2-D array and 2.0 for a 3-D array creates a 'band gap' 68 in the acoustic transmission spectrum 70 as shown in FIG. 4. The position of the band gap must be consistent with bubble formation and cavitation. The wavelength at the center of the band gap is approximately equal to or at least on the order of the spacing 'd' in the periodic array. Outside the band gap the energy in a sound wave operationally coupled to the periodic array will be transmitted through and partially absorbed by the crystal. Inside the band gap the energy in the sound wave will constructively interfere and be largely reflected. The more rows or layers to the periodic array the better defined the band gap 68 in the acoustic transmission spectrum 70.

The 'acoustic index' is defined as the ratio of the speed of sound in a control medium to the speed of sound in the material of interest. We have selected diamond as the control medium although any medium can be used. When computing the contrast or local modulation of the acoustic index the control medium cancels out leaving only the properties of the explosive materials and medium. Table 1 lists a number of materials, the speed of sound in the material and acoustic indices. As depicted there are many combinations of materials that provide a local contrast modulation (index1/index2) of greater than 1.5 or greater than 2.0.

TABLE 1

| Material | m/sec | Acoustic Index |
| --- | --- | --- |
| Diamond | 12000 | 1.00 |
| Air (STP) | 343 | 35 |
| Aluminum | 4877 | 2.46 |
| Brass | 3475 | 3.45 |
| Copper | 3901 | 3.08 |
| Iron | 5130 | 3.08 |
| Lead | 1158 | 10.36 |
| Steel | 6100 | 1.97 |
| Water | 1433 | 8.37 |

Defect cavity 54 in the periodic array creates a transmission resonance 74 within band gap 68. In general a defect may be any significant disturbance or "defect" in the periodic structure e.g. the absence of material, different geometry of the same material or a different material. However, defect cavity 54 must be some form of hole or void in the crystal structure in order to support cavitation of a gas bubble in liquid inside the defect cavity. The defect may be spherical or cylindrical for example. The defect cavity may have a diameter of typically 0.5 mm to 2 cm to sustain cavitation of, for example, bubbles having a 50 micron diameter. In a cylindrical defect a line of bubbles may form along the long axis of the cylinder thereby enhancing the total emitted flux. Techniques to construct high-Q defect cavities are well-known. The "Q" indicates how well the defect cavity resonates over many cycles of the acoustic wave to concentrate and reach a non-linear effect to initiate cavitation. Graded cavities are known to provide high Q.

Liquid 56 is selected to allow for dissolution of the gas, to provide the acoustic index contrast, to provide sufficient elasticity to sustain cavitation at the frequency of the driving pressure, and in certain cases to permit transmission of a portion of the electromagnetic spectrum resulting from the sonoluminescence. Liquids used in sonoluminescence have included silicon pump oil, sulfuric acid, acetone or water Gas 58 is selected to dissolve into the liquid and form bubbles 60 that can be driven to expand and collapse. These bubbles are typically on the order of a few microns in diameter although they vary greater during the formation and collapse process. Depending upon the application the gas may be one that undergoes a chemical reaction when heated by the cavitation process. Gases such as methane may be used. Alternately, the gas may be inert, suitably one of the lighter noble gases such as Argon or Helium.

Source 62 produces sound waves 76 that are operatively coupled to the acoustic crystal to produce a driving pressure. The acoustic crystal and defect cavity are configured and the source of sound waves selected so that the frequency content 78 of the sound waves preferably overlaps band gap 68 and particularly resonance 74. For the most efficient transfer of energy from the sound waves into the defect cavity, the dominant frequency 80 is aligned with resonance 74. The defect cavity will concentrate energy from the sound wave inside the defect cavity for some number of cycles. The effect being to cavitate gas bubble(s) 60 and produce a short pulse of high-temperature black-body radiation 82. This sonoluminescent device may be used to research the sonoluminescent phenomena itself or study cavitation or as a cavity to perform sonochemistry, nuclear fusion, create nano-particles, chemical detoxification, ultrasonic cleaning etc. For example, the pulse of black-body radiation may be used to induce or enhance a desired chemical reaction in the surrounding liquid in the defect cavity.

In general, the band gap may be positioned in the "acoustic" band from 20 Hz to 20 kHz or the "ultra sonic" band form 20 kHz to 100 MHz. This spacing may range from as small as approximately 1 micron to as large as approximately 10 cm depending upon the acoustic frequency, the materials in the periodic array, and the position of the band gap. In a specific device configuration, the band gap is positioned to balance competing interests such as size, ease of manufacture, cost, ability to form and cavitate bubbles, and in some cases the predetermined frequency of available acoustic energy. For example, if the frequency of the sound waves is relatively low than the spacing "d" of acoustic crystal, hence the overall size of the device is relatively large. Also, the frequency of the driving pressure must be high enough to form and cavitate the bubbles yet not exceed the elastic properties of the liquid. Consequently, the frequency of the sound waves may typically lie in the ultra sonic band from approximately 20 kHz to 500 kHz with typical spacing from 6 cm to 100 microns depending on the frequency, materials, bubble sizes and reasonable device sizes.

In an embodiment, a PZT produces sound waves at 100 kHz. The acoustic crystal is formed from a water medium with solid rods or spheres periodically spaced through the medium. Any solid material should provide sufficient modulation of the acoustic index. The rods or spheres are held in place by, for example, a very thin nylon or other suitable fiber network. The defect cavities are provided by removing a rod/sphere from the periodic array and allowing water to fill the void. An inert gas such as Ar is dissolved in the water medium. Note, the pressure will only build up to levels necessary for cavitation in the defect cavities, not throughout the water medium. For a 100 kHz source, the wavelength in water is approximately 1.5 cm. The rods/spheres are spaced approximately 1.5 cm apart to create a band gap that overlaps 100 kHz with a resonance frequency approximately tuned to 100 kHz In another embodiment, a PZT produces sound waves at 100 kHz. The acoustic crystal is formed from a solid silicon medium with solid rods or spheres periodically spaced through the medium. The rods/spheres may be formed from lead, copper, brass or other suitable materials that provide the requisite modulation of the acoustic index. The defect cavities are cylindrical or spherical water filled holes in place of the lead filled rods or spheres. An inert gas such as Ar is dissolved in the water filled holes. For a 100 kHz source, the wavelength in silicon is approximately 6 cm. The rods/spheres are spaced approximately 6 cm apart to create a band gap that overlaps 100 kHz with a resonance frequency approximately tuned to 100 kHz.

Figure 5:
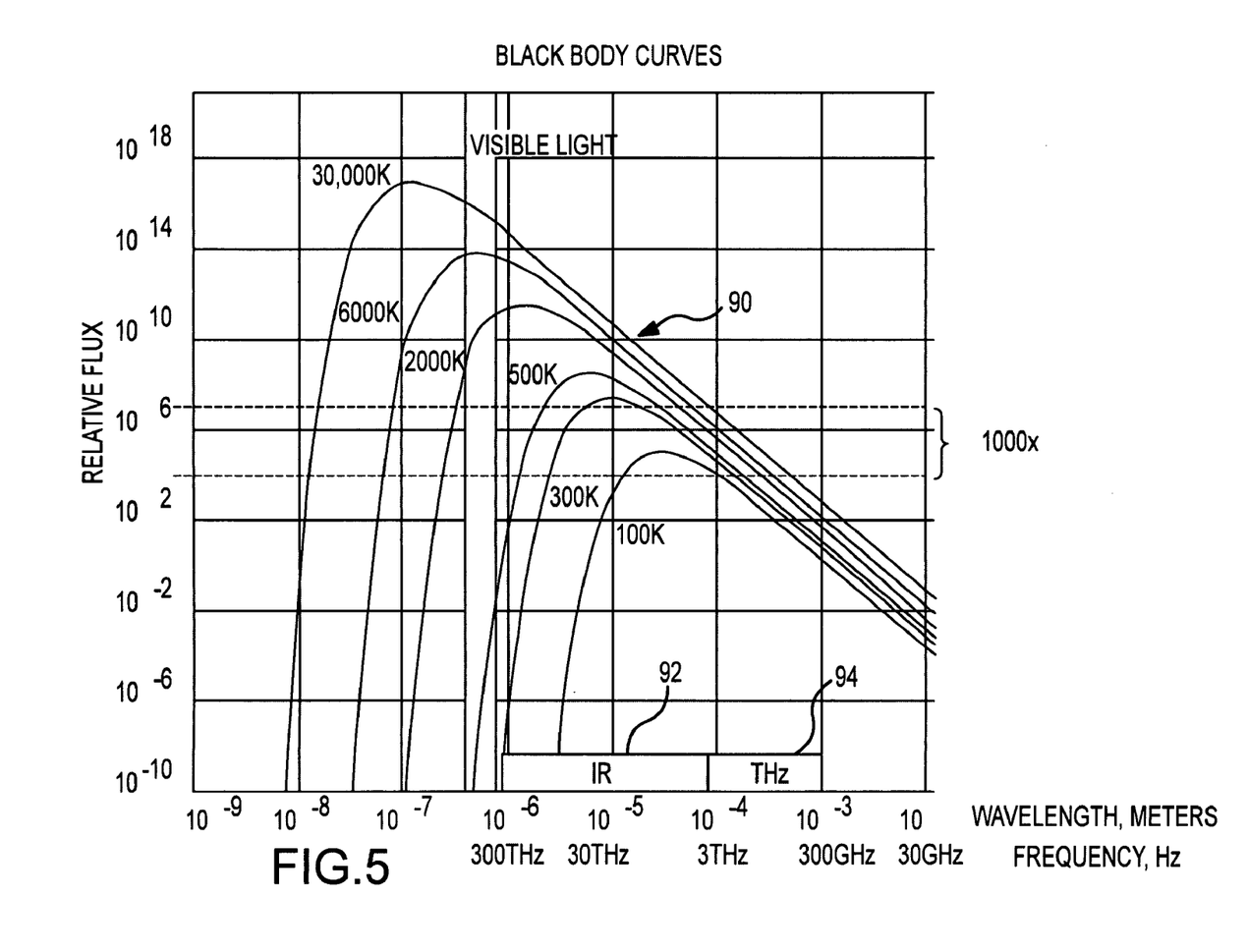
FIG. 5 is a plot of black-body curves at elevated temperatures achievable using sonoluminescence.

Sonoluminescence has been demonstrated to produce temperatures in excess of 15,000 K and up to 30,000 K. As shown in FIG. 5, the curve 90 of black-body radiation shifts up and to towards short wavelengths as the temperature increases. As shown in the log-log plot of flux versus wavelength, the increase in flux across the spectrum from 300K (room temperature) to 30,000K is nearly three orders of magnitude (1000×) in the THz region 92 and considerably larger in the IR region 94.

Although the sonoluminescence phenomena produces the high temperature pulse, the use of an acoustic crystal with defect cavities to concentrate the sound energy to cavitate the bubbles should improve the power efficiency and may increase the associated temperature and/or the number of bubbles cavitated, either of which increase the radiated flux. An additional benefit is that a single source 62 may be used to provide sufficient driving pressure to cavitate the bubbles inside multiple defect cavities. Typical sonoluminescent devices require multiple PZTs.

Acoustic Crystal Sonoluminescent Electromagnetic Sources

THz-frequency radiation, in the frequency region from approximately 300 GHz to approximately 4 THz, has been relatively unexploited compared to the adjacent radio frequency (RF) and IR spectral bands. This is largely because of transmission difficulties due to absorption by atmospheric water vapor but also due to a lack of practical radiation sources. In recent years there has been a significant growth of interest in applications of this previously underutilized portion of the electromagnetic spectrum.

One of the major bottlenecks for the successful implementation of THz-frequency systems is the limited output power of conventional THz sources. Most systems produce THz radiation via optical techniques, but those require massive lasers, complex optical networks and cooling systems. Some of the THz sources reported in the literature include optically pumped THz lasers, time-domain spectroscopy, backward wave oscillators, solid-state amplifiers combined with direct multipliers, and photo-mixers (Iida, M. et al., *Enhanced generation of terahertz radiation using 3D photonic crystals with a planar defect*, Proc. CLEO/QELS, June 2002 (Baltimore), Section CM1; Unterrainer, K. et al.; *Cavity enhanced few cycle THz generation and coherent spectroscopy*, Proc. CLEO/QELS, June 2002 (Baltimore), Section CM1; Han, H., Park, H., Cho, M., and Kim, J., *Terahertz pulse propagation in a plastic photonic crystal fiber*, Applied Physics Lett., 80 #15, 15 Apr. 2002). The different sources have disadvantages including limited output power; excessive cost, size and weight; poor reliability and limited frequency agility. U.S. Pat. Nos. 7,078,697 and 7,257,333 are directed to the use of photonic crystals to produce enhanced thermal emissions in the IR and THz regions.

As discussed, the cavitation of bubbles produces short pulses of very high temperature black-body radiation. With known sonoluminescent devices, this radiation is seen as short flashes of blue light. The configuration of those devices is such that the wavelengths for blue light can escape and be seen or measured. The other wavelengths of the visible spectrum as well as the longer IR and THz spectrum are readily absorbed in the liquid inside the cavity and lost.

The acoustic crystal sonoluminescent cavitation device may be operatively coupled to a waveguide tuned to a specified center wavelength to extract a band of wavelengths around the center wavelength from the enhanced black-body radiation, collect the radiation from the one or more defect cavities in the acoustic crystal and route the radiation to an output port for controlled emission. By positioning the waveguide close to the defect cavity (e.g. suitably less than 5× the extracted IR or THz wavelength) the desired wavelengths can be efficiently extracted. Various technologies such as embedded photonic crystal defect cavities, photonic crystal optical fibers and Sommerfeld waveguides may be used in 2D or 3D configurations to extract the specified bands. The IR and THz bands are of particular interest due to the general lack of commercially viable sources. The "Q" indicates how well the defect cavity resonates over many cycles of the acoustic wave to concentrate and reach a non-linear effect to initiate detonation and thus determine the width of the band. Techniques to construct high-Q defect cavities are well-known. Graded cavities are known to provide high Q. The waveguide could, however, be configured to extract any portion of the black-body radiation.

Figure 6A:
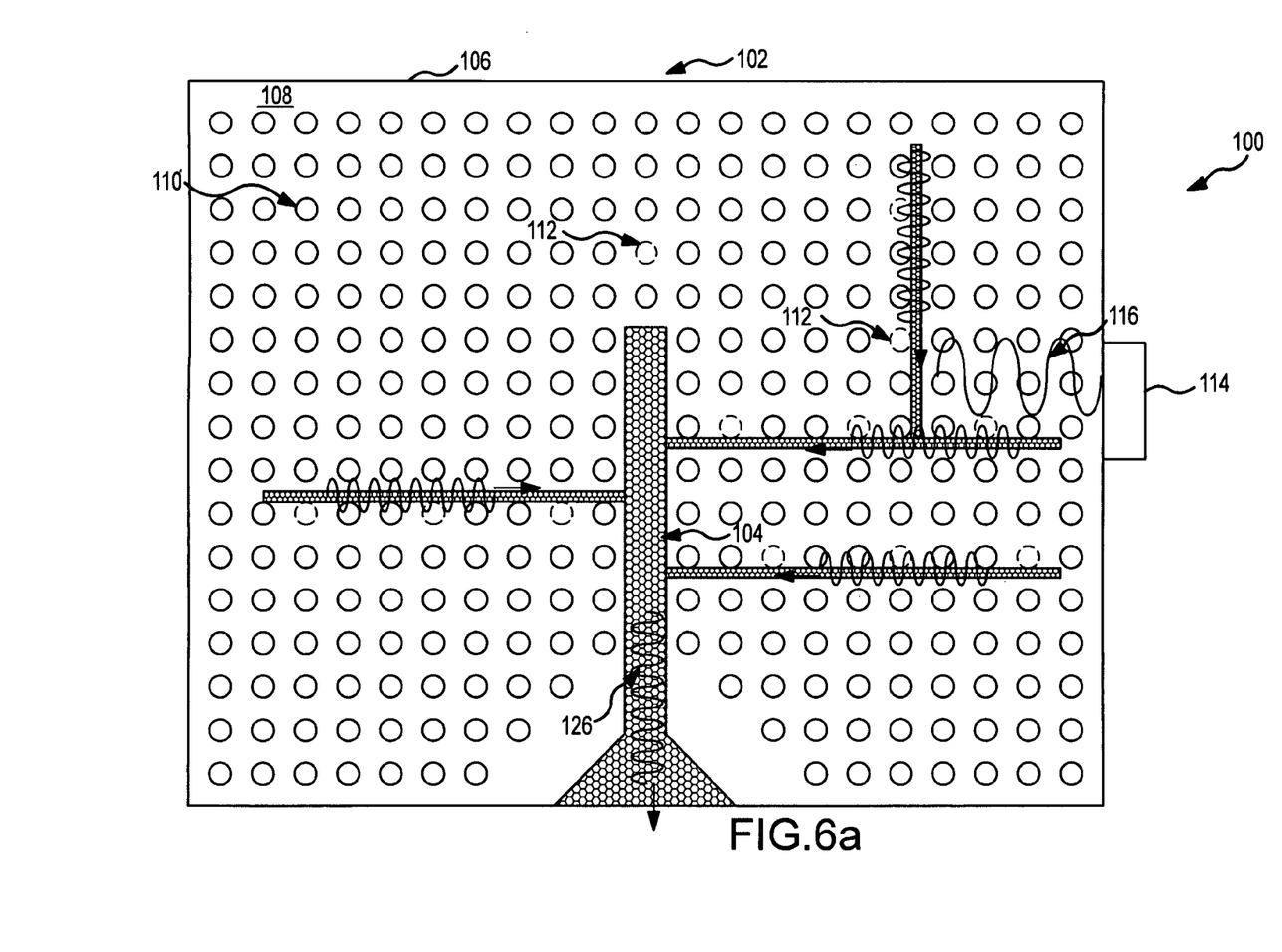
FIGS. 6a and 6b are respectively a diagram of an acoustic crystal sonoluminescent source of electromagnetic radiation and a diagram of an embedded photonic crystal defect waveguide embedded in the acoustic crystal to extract, collect and route a band of EM radiation around a specified source wavelength to an output antenna.
Figure 6B:
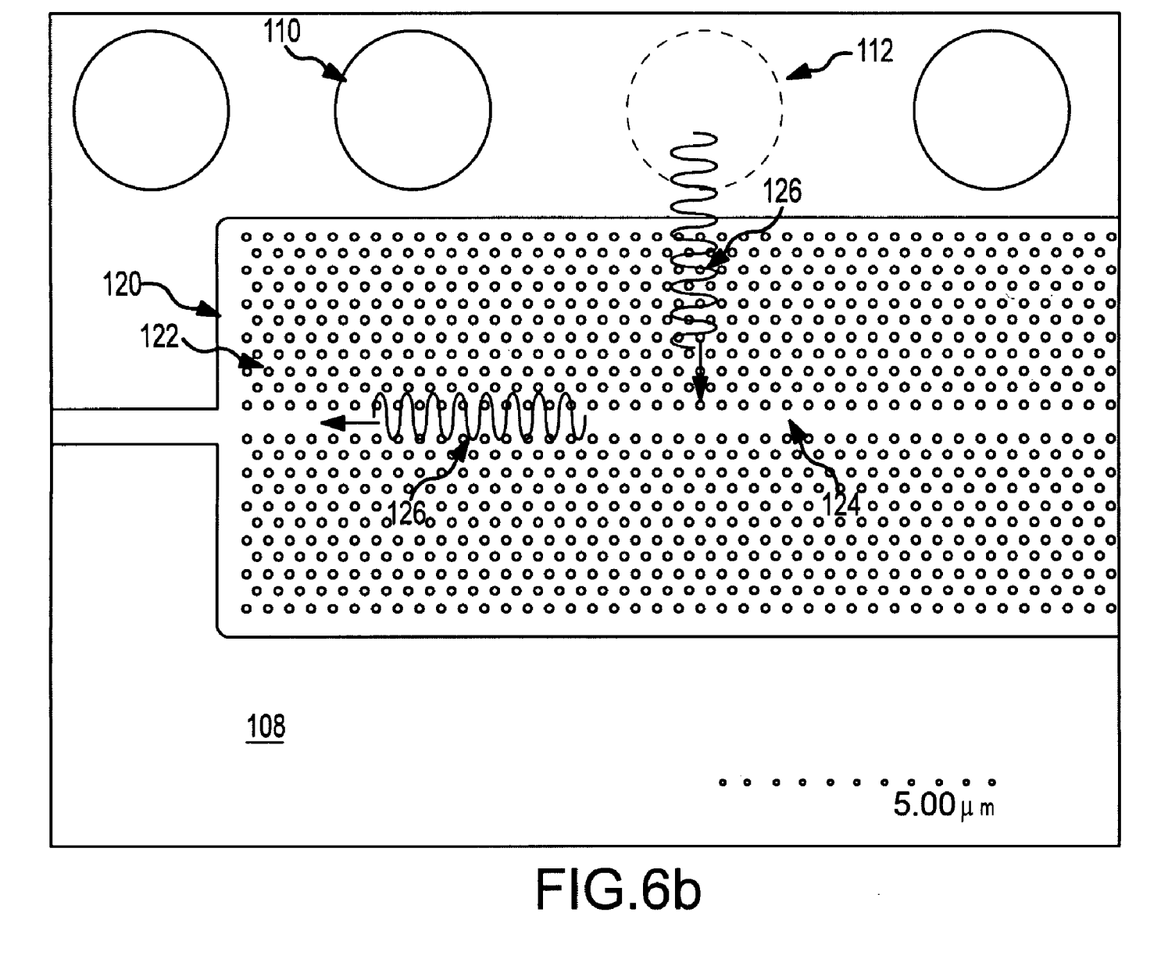

An embodiment of an acoustic crystal sonoluminescent source 100 that combines an acoustic crystal cavitation device 102 and an embedded photonic crystal defect waveguide 104 is illustrated in FIGS. 6a and 6b. Sonoluminescent cavitation device 100 comprises an acoustic crystal 106 including first and second materials 108, 110 having difference acoustic indices. The materials are arranged in a periodic array that provides local contrast modulation of the acoustic index in at least one dimension to define a band gap in the acoustic or ultrasonic transmission spectra. At least one and as shown multiple defect cavities 112 in the periodic array create a resonance in the band gap. An inert gas is dissolved in a liquid in the defect cavities. A source 114 of sound waves 116 is operatively coupled to the periodic array. The sound waves are concentrated in the defect cavities to cause the bubble to expand and collapse (cavitate) producing a pulse of broadband black-body radiation.

Photonic crystal defect waveguide 104 includes third and fourth materials 120, 122 having different refractive indices. The materials are arranged in a periodic array that provides local contrast modulation of the refractive index in at least one dimension to define a band gap in the electromagnetic spectrum (e.g. within the IR or THz bands). The photonic crystal has a period at least 10× smaller than the period of the acoustic crystal. As such the embedded waveguide does not interfere with the sound waves propagating through the acoustic crystal. At least one and typically multiple defects 124 in the periodic array of the photonic crystal are tuned to resonate at the specified source wavelength. The defects are positioned to couple to the acoustic defect cavities 112 and to each other to extract radiation 126 in a band around the source wavelength emanating from the acoustic defect cavities, collect the radiation and routing it to an output port for emission by an antenna 128. For example, defects 124 are suitably positioned within 5× the extracted source wavelength and more preferably within 3× from the acoustic defect cavity 112 and each other. In this embodiment, antenna 128 is a horn formed from the photonic crystal itself.

The 'refractive index' is defined as the ratio of the speed of light in a vacuum to the speed of light in the material of interest. Table 2 lists a number of materials with their refractive index. As depicted there are many combinations of materials that provide a local contrast modulation (index1/index2) of greater than 1.5 or greater than 2.0.

TABLE 2

| Material | Refractive Index |
|---|---|
| Benzene | 1.501 |
| Water | 1.333 |
| Ethyl Alcohol | 1.361 |
| Carbon Tetrachloride | 1.461 |
| Carbon Disulfide | 1.628 |
| Diamond | 2.419 |
| Strontium Titanate | 2.41 |
| Amber | 1.55 |
| Fused Silica | 1.458 |
| Sodium Chloride | 1.50 |
| Cubic Zirconia | 2.15-2.18 |
| Moissanite | 2.69-3.02 |
| Gallium (III) Phosphide | 3.5 |
| Gallium (III) Arsenide | 3.927 |
| Silicon | 4.01 |

In an embodiment, the photonic crystal defect waveguide 104 is configured for use with an acoustic crystal cavitation device 102 in which solid rods or spheres are periodically spaced in a water medium and driven at 100 kHz as previously described. The defect cavities being absent rods or spheres in the periodic array. The photonic crystal waveguide is relatively small, typically 1 to 3 mm diameter or square, silicon rods 120 with holes 122 spaced at 1 to 500 micron intervals with missing holes (solid silicon) forming the defects 124. As such the waveguide does not interfere with the coupling of the incident sound waves to the acoustic defect cavities. The spacing of holes 122 determines the band gap and resonance of the photonic crystal. IR is approximately 1 to 30 microns and THz is typically 300 GHz to 4 THz. The "Q" of the defect will determine the width of the extracted band. For IR, typical bandwidths range from 0.1 to 3 microns. For THz, typical bandwidths range from 30 GHz to 400 GHz.

In another embodiment, the photonic crystal defect waveguide 104 is configured for use with an acoustic crystal cavitation device 102 in which solid rods or spheres are periodically spaced in a silicon medium and driven at 100 kHz as previously described. The defect cavities being water filled cavities in the periodic array. The photonic crystal waveguide can be integrated directly into the silicon medium of the acoustic crystal near the defect cavity elements. As above, the holes 122 are spaced from 1 to 500 microns depending on the desired source wavelengths with missing holes providing the defects.

Figures 7A, 7B:
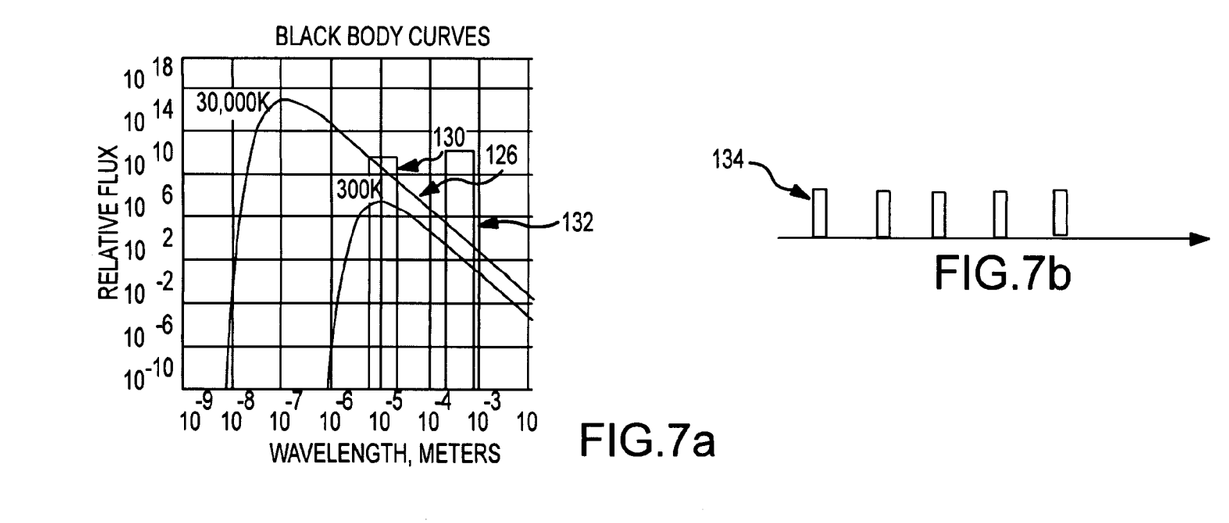
FIGS. 7a through 7c are respectively a black-body curve illustrating the IR or THz bands emitted from the source, the sequence of IR or THz pulses emitted and the extraction and collection of black-body radiation over a volume dictated by device geometry and the emission of the IR or THz band into a volume determined by the antenna.
Figure 7C:
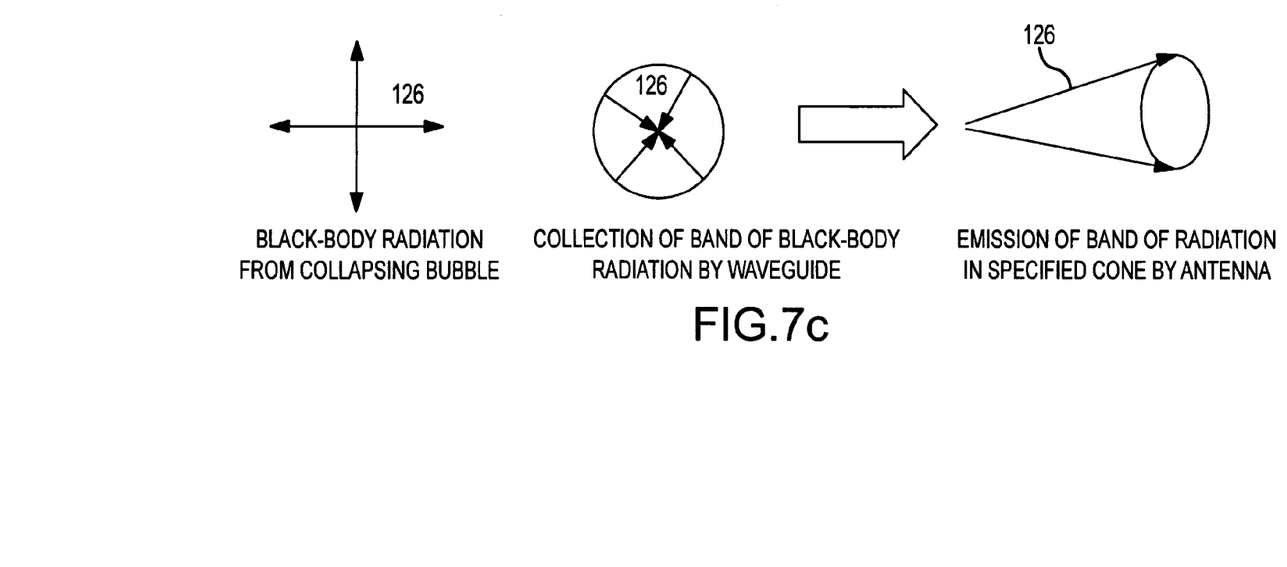

As shown in FIGS. 7a through 7c, acoustic crystal sonoluminescent source 100 emits narrow or broadband radiation 126 in the IR or THz bands 130, 132, respectively in a sequence of pulses 134 with a prescribed cone 136. As described previously the center wavelength and width of the band are set by the design of the photonic crystal and defects. The total flux radiated is a function of not only the temperature produced by the cavitation of an individual bubble (which may be enhanced by the concentration of sound energy into the defect cavity) but also the total number of bubbles in each cavity (may be enhanced by the concentration of energy), the total number of acoustic defect cavities that are coupled together and the low loss of the photonic crystal defect waveguide to extract and route the radiation to the antenna. As shown in FIG. 7b, the repetition rate of pulses 134 may equal to that of the sound waves (assuming each cycle produces cavitation) or a multiple thereof (assuming N cycles produce 1 cavitation). As shown in FIG. 7c, the black-body radiation 126 emanates in all directions from a collapsing bubble. The waveguide may be configured to extract and collect the band of radiation in all directions and route the accumulated radiation to the antenna. The antenna can be configured to concentrate the energy and emit the band of radiation in a specified cone as opposed to radiating in all directions. As such the combination of the acoustic crystal cavitation device with a waveguide may produce viable IR or THz sources.

Figure 8A:
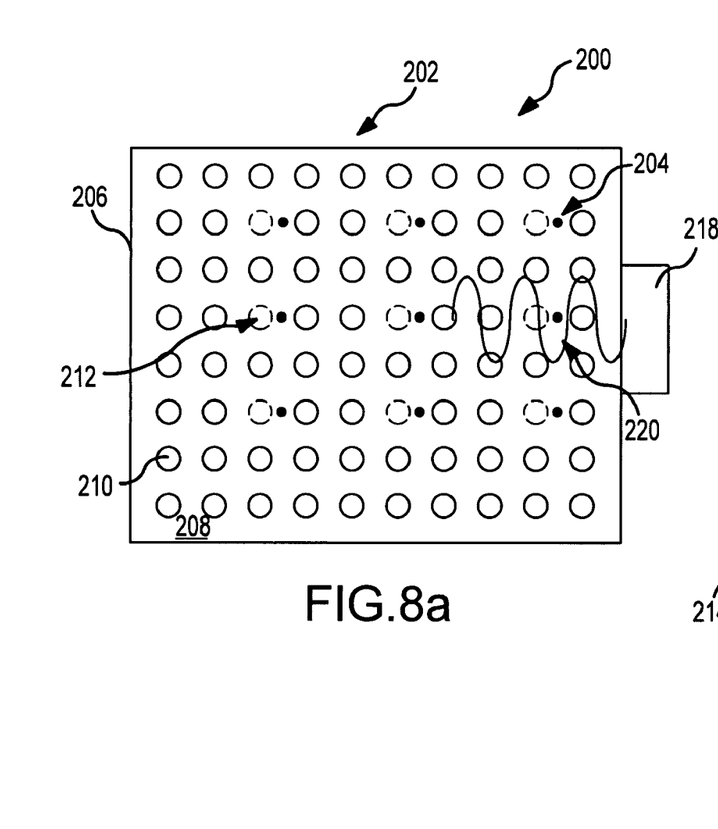
FIGS. 8a, 8b and 8c are respectively a plan view of embedded photonic crystal optical fibers or Sommerfeld waveguides embedded near defect cavities in the acoustic crystal to extract, collect and route a band of EM radiation around a specified source wavelength to an output antenna.
Figure 8B:
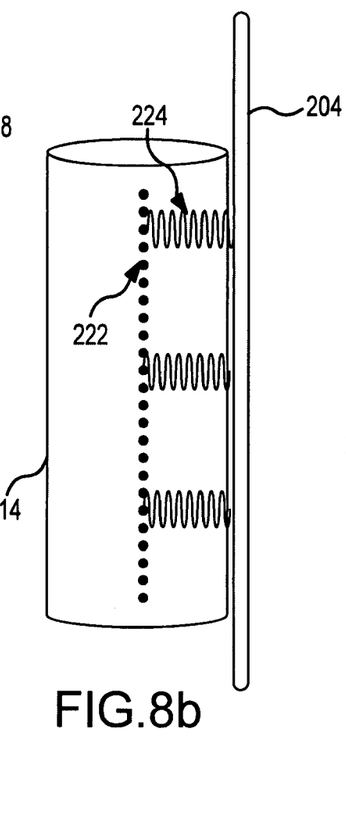
Figure 8C:
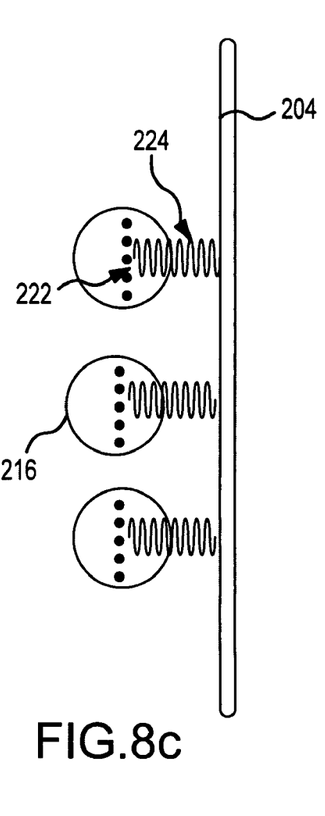

Another embodiment of an acoustic crystal sonoluminescent source 200 that combines an acoustic crystal cavitation device 202 and an embedded waveguide 204 is illustrated in FIGS. 8a through 8c. Sonoluminescent cavitation device 200 comprises an acoustic crystal 206 including first and second materials 208, 210 having difference acoustic indices. The materials are arranged in a periodic array that provides local contrast modulation of the acoustic index in at least one dimension to define a band gap in the acoustic or ultrasonic transmission spectra. At least one and as shown multiple defect cavities 212 in the periodic array create a resonance in the band gap. An inert gas is dissolved in a liquid in the defect cavities. In one configuration, the defect cavities are a 2D array of cylinders 214 as shown in FIG. 8b. In another configuration, the defect cavities are a 3D array of spheres 216 as shown in FIG. 8c. A source 218 of sound waves 220 is operatively coupled to the periodic array. The sound waves are concentrated in the defect cavities to cause the bubble 222 to expand and collapse (cavitate) producing a pulse of broadband black-body radiation 224.

Waveguide 204 may be, for example, a photonic crystal optical fiber or a Sommerfeld waveguide (uncoated wire). Multiple waveguides tuned to different source wavelengths may be embedded around the defect cavities or possibly inside the defect cavities. The spacing between the acoustic defect and the waveguide depends on wavelength extracted; longer wavelength THz must be closer than IR. The fibers or wires are collected into a common fiber or wire that routes the extracted radiation to an output port and antenna (not shown). Photonic crystal optical fibers typically include a hollow core (defect) surrounded by a pattern of small holes in the fiber to form a 2D photonic crystal that constrains the band of electromagnetic energy that is coupled into the fiber and travels along the interior of the fiber without losses. The far end of the fiber is suitably terminated with a mirror. Such fibers are used at 1.5 micron in the near IR for telecommunications and at 10.6 microns in the LWIR for medical applications. Johnathan C. Knight's article on "Photonic Crystal Fibres" published in Nature, VOl 424, Aug. 14, 2000 pp. 847-851 provides a more complete description and is hereby incorporated by reference. Sommerfeld waveguides typically include an uncoated wire that supports surface-wave propagation for THz bands. The radius of the wire is set to select the source wavelength. Sommerfeld waveguides are well known and described by M. J. King and J. C. Wiltse in "Surface-Wave Propagation on Coated or Uncoated Metal Wires at Millimeter Wavelengths" published in IRE Transaction on Antennas and Propagation May 1962 pp. 246-254, and Righini et al. in "Terahertz Flexible Waveguides" published in Proceedings of SPIE, Vol. 7366, p. 776660Z-1 (June 2009), which are hereby incorporated by reference.

Figures 9A, 9B:
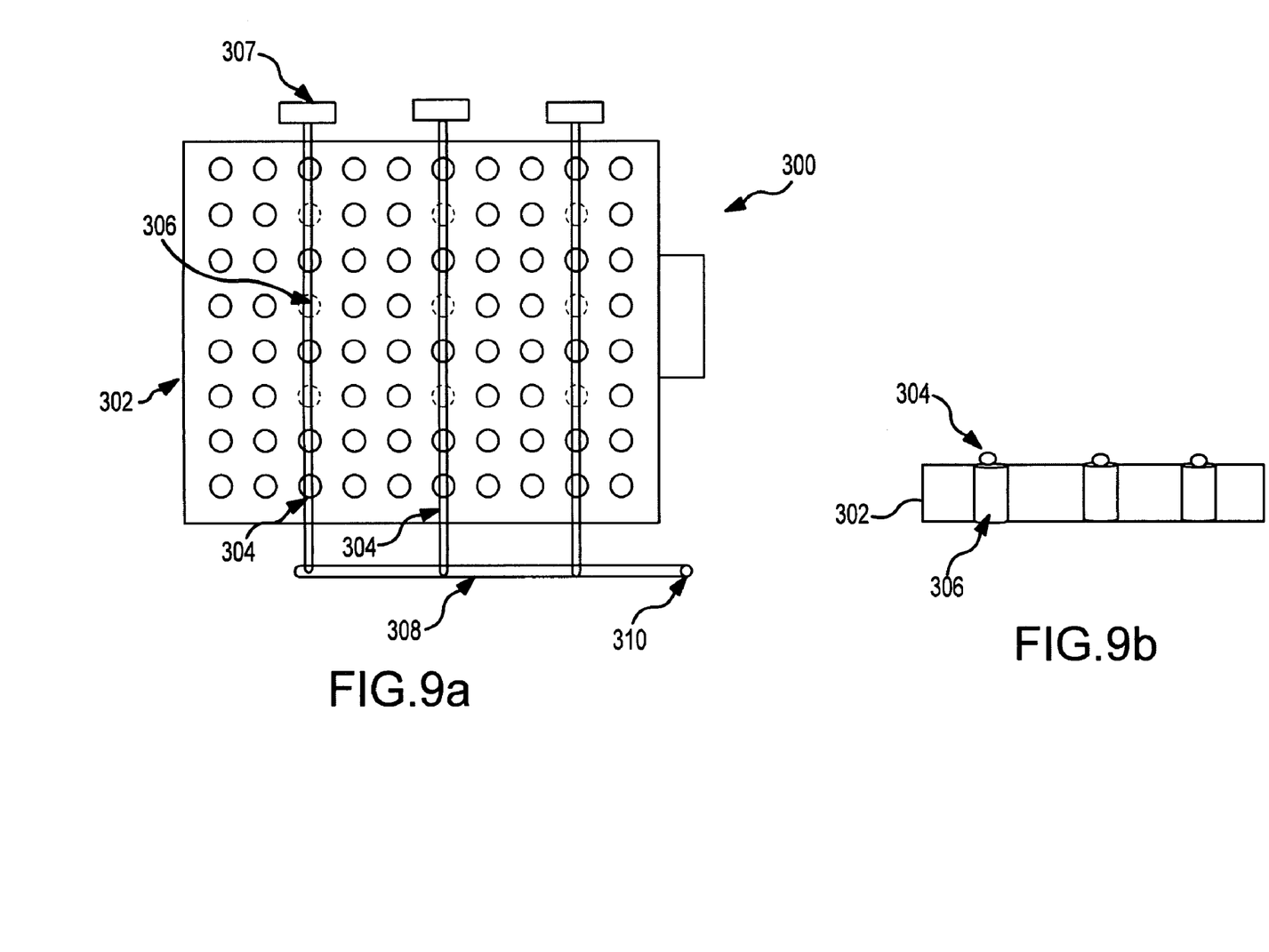
FIGS. 9a and 9b are plan and end views of photonic crystal optical fibers or Sommerfeld waveguides coupled to defect cavities in the acoustic crystal.

Another embodiment of an acoustic crystal sonoluminescent source 300 that combines an acoustic crystal cavitation device 302 and a waveguide 304 is illustrated in FIGS. 9a and 9b. In this embodiment, the waveguides 304 (either photonic crystal optical fibers or Sommerfeld waveguides) are positioned above the acoustic defect cavities 306. Each waveguide may extract radiation in the desired band from one or more acoustic defect cavities. The far end of the optical fiber is suitably terminated with a mirror 307. A common waveguide 308 collects radiation from each of the waveguides and routes the radiation to an output port 310. This structure may be stacked into a 3D structure and the outputs coupled together to further enhance the emission of radiation.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A sonoluminescent cavitation device, comprising:
an acoustic crystal including first and second materials having different acoustic indices, said materials arranged in a periodic array that provides local contrast modulation of the acoustic index in at least one dimension to define a band gap in the acoustic or ultrasonic transmission spectra;
at least one defect cavity in the periodic array that creates a resonance in the band gap;
a liquid in said defect cavity;
a gas dissolved in the liquid; and
a source of sound waves that are operatively coupled to the periodic array, said sound waves concentrated in said at least one defect cavity to cause the bubble to expand and collapse producing a pulse of black-body radiation.

2. The sonoluminescent cavitation device of claim 1, wherein the contrast modulation is at least 1.3 for a 1D periodic array, 1.6 for a 2D periodic array and 2 for a 3D periodic array.

3. The sonoluminescent cavitation device of claim 1, wherein the band gap lies in the acoustic spectra from approximately 20 kHz to 500 kHz.

4. The sonoluminescent cavitation device of claim 3, wherein the periodic spacing of the first and second materials in the periodic array is between 100 microns and 6 cm.

5. The sonoluminescent cavitation device of claim 1, further comprising a plurality of said defect cavities that contain a gas dissolved in a liquid, said sound waves causing bubbles to expand and collapse in said plurality of said defect cavities producing respective pulses of black-body radiation.

6. The sonoluminescent cavitation device of claim 1, wherein said defect cavities are cylindrical, a plurality of gas bubbles forming along a long axis of the cylinder.

7. The sonoluminescent cavitation device of claim 1, wherein said sound waves are characterized by a dominant frequency that lies within the band gap.

8. The sonoluminescent cavitation device of claim 7, wherein the dominant frequency is approximately equal to the resonance frequency of the defect cavity.

9. The sonoluminescent cavitation device of claim 1, wherein said source of sound waves comprises a single piezoelectric transducer.

10. The sonoluminescent cavitation device of claim 1, wherein said pulse of black-body radiation induces or enhances a desired chemical reaction in the surrounding liquid in the defect cavity.

11. A sonoluminescent source of electromagnetic radiation, comprising:
an acoustic crystal including first and second materials having difference acoustic indices, said materials arranged in a periodic array that provides local contrast modulation of the acoustic index in at least one dimension to define a band gap in the acoustic or ultrasonic transmission spectra;
at least one defect cavity in the periodic array that creates a resonance in the band gap;
a liquid in said defect cavity;
an inert gas dissolved in the liquid;
a source of sound waves that are operatively coupled to the periodic array, said sound waves concentrated in said at least one defect cavity to cause the bubble to expand and collapse producing a pulse of black-body radiation; and
a waveguide operatively coupled to said acoustic crystal, said waveguide tuned to a specified source wavelength to extract a band of the black-body radiation around the source wavelength emitted from said at least one defect cavity, collect the radiation in said band and route the radiation to an output port.

12. The sonoluminescent device of claim 11, wherein the band gap lies in the acoustic spectrum from approximately 20 kHz to approximately 500 kHz and the band lies in the THz spectrum from approximately 300 GHz to approximately 4 THz or the infrared (IR) spectrum from approximately 1 micron to approximately 30 microns.

13. The sonoluminescent device of claim 11, wherein the band lies in the THz spectrum and has a band width between approximately 30 GHz and approximately 300 GHz.

14. The sonoluminescent device of claim 11, wherein the band lies in the IR spectrum and has a band width between approximately 0.1 micron and approximately 3 microns.

15. The sonoluminescent device of claim 11, further comprising a plurality of said defect cavities that contain an inert gas dissolved in a liquid, said sound waves causing bubbles to expand and collapse in said plurality of said defect cavities producing respective pulses of black-body radiation, said waveguide extracting radiation in said band from the plurality of defect cavities, collecting and routing the radiation to the output port.

16. The sonoluminescent device of claim 11, wherein the physical size of the waveguide is less than one wavelength of the sound waves.

17. The sonoluminescent device of claim 11, further comprising a second waveguide operatively coupled to said acoustic crystal, said second waveguide tuned to a different second specified source wavelength to extract a different second band of the black-body radiation around the second source wavelength from said at least one defect cavity, collect the radiation in said band and route the radiation to a second output port.

18. The sonoluminescent device of claim 11, wherein the waveguide comprises:
a photonic crystal including third and fourth materials having different refractive indices, said materials arranged in a periodic array that provides local contrast modulation of the refractive index in at least one dimension to define a band gap in the electromagnetic spectrum, said photonic crystal having a period at least 10× smaller than the period of the acoustic crystal; and at least one defect in the periodic array of the photonic crystal tuned to resonate at the specified source wavelength and positioned to couple to the at least one defect cavity in the acoustic crystal, said at least one defect extracting radiation in a band around the source wavelength from said at least one defect cavity, collecting the radiation in said band and routing the radiation to the output port.

19. The sonoluminescent device of claim 11, wherein the waveguide comprises a linear conductor proximate each of said at least one defect cavities, said linear conductor tuned to couple radiation in a band around the specified source wavelength emitted from the defect cavities in said pulse.

20. The sonoluminescent device of claim 11, wherein the waveguide comprises a photonic crystal optical fiber.

21. The sonoluminescent device of claim 11, wherein the sound waves produce a sequence of pulses of black-body radiations, a like sequence of pulses of radiation in said band around the specified source wavelength routed to the output port.

* * * * *